United States Patent

Dittrich et al.

(10) Patent No.: US 8,004,721 B2
(45) Date of Patent: Aug. 23, 2011

(54) HALFTONE APPARATUS THAT PROVIDES SIMULTANEOUS, MULTIPLE LINES PER INCH SCREENS

(75) Inventors: Danielle Kathryn Dittrich, Longmont, CO (US); Joan LaVerne Mitchell, Longmont, CO (US); Yue Qiao, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 931 days.

(21) Appl. No.: 11/879,888

(22) Filed: Sep. 6, 2006

(65) Prior Publication Data

US 2008/0068659 A1 Mar. 20, 2008

Related U.S. Application Data

(63) Continuation of application No. 09/571,181, filed on May 16, 2000, now Pat. No. 7,170,639.

(51) Int. Cl.
*H04N 1/407* (2006.01)
*H04N 1/409* (2006.01)

(52) U.S. Cl. ............... 358/3.21; 358/3.01; 358/3.26

(58) Field of Classification Search .......... 358/1.9, 358/2.1, 2.99, 3.01, 3.02, 3.06, 3.09, 3.1, 358/3.21, 3.26, 463; 382/176, 209
See application file for complete search history.

(56) References Cited

U.S. PATENT DOCUMENTS

| 3,573,789 | A |   | 4/1971  | Sharp et al.          |
|-----------|---|---|---------|-----------------------|
| 5,107,349 | A |   | 4/1992  | Ng et al.             |
| 5,185,673 | A | * | 2/1993  | Sobol ........... 358/296 |
| 5,270,835 | A |   | 12/1993 | Urabe et al.          |
| 5,291,310 | A |   | 3/1994  | Levien                |
| 5,382,967 | A |   | 1/1995  | Curry                 |
| 5,386,301 | A |   | 1/1995  | Yuasa et al.          |
| 5,471,543 | A | * | 11/1995 | Ng et al. ........ 382/173 |
| 5,489,991 | A | * | 2/1996  | McMurray ...... 358/3.23 |
| 5,587,811 | A |   | 12/1996 | Liguori               |
| 5,742,703 | A | * | 4/1998  | Lin et al. ....... 382/176 |
| 5,751,470 | A |   | 5/1998  | Damon                 |
| 5,903,713 | A |   | 5/1999  | Daels                 |
| 5,920,682 | A |   | 7/1999  | Shu et al.            |
| 6,137,518 | A |   | 10/2000 | Maeda                 |

* cited by examiner

*Primary Examiner* — James A Thompson
(74) *Attorney, Agent, or Firm* — Merchant & Gould

(57) ABSTRACT

A halftone threshold matrix includes a plurality of submatrices, wherein a first group of the plurality of submatrices has a line screen frequency different from a second group of the plurality of submatrices. The halftone method and apparatus removes the restriction that at most one pel is turned on per basic cell for the next constant input level and allows the pels in some basic cells to be turned on much sooner that the corresponding positions in other basic cells. This creates a dominant low frequency line screen simultaneously with the higher frequency line screen of the other basic cells. The present invention also allows the basic cells inside the threshold matrix to have different shapes and sizes. Thus, the cells participating in the low frequency screen could be larger than the cells generating the higher frequency screen. For example, the low frequency screen's pleasing patterns can distract the eye from noticing less pleasing patterns in the high frequency grid and vice versa.

12 Claims, 4 Drawing Sheets

HALFTONE APPARATUS THAT PROVIDES SIMULTANEOUS, MULTIPLE LINES PER INCH SCREENS

CROSS-REFERENCE TO RELATED APPLICATIONS

This application is a related to the following co-pending and commonly-assigned patent application, which is hereby incorporated herein by reference in it respective entirety:

"HALFTONE METHOD AND APPARATUS THAT PROVIDES A LINE SCREEN FREQUENCY OF N/2 FOR A PRINTER RESOLUTION OF N DOTS PER INCH WITHOUT NEGATIVE PRINT EFFECTS" to Joan L. Mitchell et al., having application Ser. No. 09/571,968.

This application is a continuation to co-pending and commonly-assigned patent application Ser. No. 09/571,181 entitled "HALFTONE METHOD AND APPARATUS THAT PROVIDES SIMULTANEOUS, MULTIPLE LINES PER INCH SCREENS", which is hereby incorporated herein by reference in it respective entirety.

BACKGROUND OF THE INVENTION

1. Field of the Invention

This invention relates in general to halftone image processing, and more particularly to a halftone method and apparatus that provides simultaneous, multiple lines per inch screens.

2. Description of Related Art

As an approximation to continuous tone images, pictorial imagery is represented via a halftone image processing apparatus and process in which each input picture element (pel) is translated into a j×k pattern of recorded elements, where j and k are positive integers. Herein, it will be understood that separate threshold matrices are used for each color component. However, as will become obvious from the discussion treat follows, the color components will not be considered together. Rather, the term "pel" will be used to refer to "samples" in an array. A halftone image is reproduced by printing the respective pels or leaving them blank. That is, by suitably distributing the recorded elements.

Image processing apparatus and processes are evaluated in part, by their capability of delivering a complete gray scale at normal viewing distances. The capability of a particular process to reproduce high frequency renditions (fine detail) with high contrast modulation makes that procedure superior to one which reproduces such fine detail with lesser or no output contrast.

Another measure of image processing apparatus and process merit is the tendency to produce visual artifacts in the output image that are not part of the original image, but are the result of the image processing, including moiré patterns, false contours, and false textures. Moiré patterns are false details created most often by the beating between two relatively high frequency processes resulting in a signal whose spacial frequency is low enough to be seen by the viewer. False contours are the result of gray scale quantization steps which are sufficiently large to create a visible contour when the input image is truly a smooth, gradual variation from one to the other. False textures are artificial changes in the image texture which occur when input gray levels vary slowly and smoothly and the output generates an artificial boundary between the textural patterns for one gray level and the textural patterns for the next gray level.

Halftone threshold matrices are used to convert grayscale images and graphics into binary images. The density of the picture elements (pels) in a region is indicative of the original values in that region. Originally, these matrices contained one basic cell in which at most one additional pel was turned on with an increment to the next input value. Larger basic cells allowed more shades to be represented, but cut down on the amount of detail that could be preserved since they had a coarse screen frequency (i.e., generated patterns with a low number of lines per inch in the halftone screen). A problem exists with the number of density levels attainable within a limited resolution and acceptable screen frequency. One way to get more gray levels is to reduce the number of lines per inch and adoption of larger matrix dimensions, but this decreases the resolution and decreases the screen frequency.

Later, multiple basic cells were grouped together into a supercell. The supercell approach attempts to improve both gradation and resolution. This method is generally referred to as the "Improved Halftone" (IH) method.

For example, in the IH method, an 8×8 superthreshold value matrix may be divided into four 4×4 submatrices. The small matrix is adopted for the resolution unit, and the large matrix is adopted for the gradation unit. Thus, the amount of detail is determined by the basic cell size while the number of shades depends upon the supercell size. As the supercells have become larger, more than one pel inside the supercell is turned on for the next input level. However, never more than one pel is turned on at a time inside a basic cell for the next constant input level. The patterns generated by repetition of the original basic cell are contained in the patterns generated by the supercell.

It can be seen that there is a need for a halftone apparatus that provides simultaneous, multiple lines per inch screens.

SUMMARY OF THE INVENTION

To overcome the limitations in the prior art described above, and to overcome other limitations that will become apparent upon reading and understanding the present specification, the present invention discloses a halftone apparatus that provides simultaneous, multiple lines per inch screens.

The present invention solves the above-described problems by providing a halftone apparatus that removes the restriction that at most one pel is turned on per basic cell for the next constant input level and allows the pels in some basic cells to be turned on much sooner than the corresponding positions in other basic cells. This creates a dominant low, frequency line screen simultaneously with the higher frequency line screen of the other basic cells. Our invention also allows the basic cells inside the threshold matrix to have different shapes and sizes. Thus, the cells participating in the low frequency screen could be larger than the cells generating the higher frequency screen. For example, the low frequency screen's pleasing patterns can distract the eye from noticing less pleasing patterns in the high frequency grid and vice versa.

A halftoning threshold matrix in accordance with the principles of the present invention includes a plurality of submatrices, wherein a first group of the plurality of submatrices has a line screen frequency different from a second group of the plurality of submatrices.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 5a illustrates the structure of a basic cell;

FIG. 5b illustrates the structure of a supercell;

FIG. 6 illustrates a supercell according to the present invention wherein the restriction that at most one pel is turned on per basic cell for the next constant input level is removed and the pels in some basic cells are turned on much sooner that the corresponding positions in other basic cells; and FIG. 7 illustrates a supercell structure according to the present invention wherein cells of different sizes and shapes are used.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a halftone apparatus that here removes that restriction that at most one pel is turned on per basic cell for the next constant input level and allows the pels in some basic cells to be turned on much sooner that the corresponding positions in other basic cells. This creates a dominant low frequency line screen simultaneously with the higher frequency line screen of the other basic cells. The present invention also allows the basic cells inside the threshold matrix to have different shapes and sizes. Thus, the cells participating in the low frequency screen could be larger than the cells generating the higher frequency screen. For example, the low frequency screen's pleasing patterns can distract the eye from noticing less pleasing patterns in the high frequency grid and vice versa.

Figure 1:
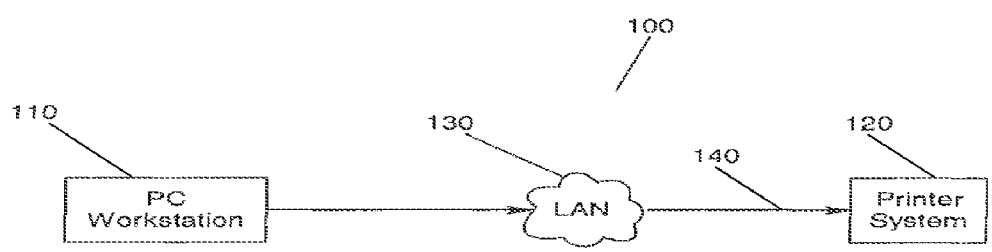
FIG. 1 illustrates a simplified block diagram of a printing environment according to the present invention.

FIG. 1 illustrates a simplified block diagram of a printing environment 100 according to the present invention. In FIG. 1, a personal computer workstation 110 is coupled to a printer system 120 via a local area network (LAN) 130. The personal computer workstation 110 sends print data to the printer system 120 when the personal computer workstation 110 has data to print. Those skilled in the art will recognize that the present invention may be a multitone printer, which includes bi-level printers. However, the present invention is not meant to be limited to any particular type of printer.

The printer system 120 converts the input print data stream 140 to a data stream supported by the printer system 120. For example, the printer system 120 may accept the Intelligent Printer Data Stream (IPDS), PostScript, or some other printer data stream. The printer system 120 may also be configured to perform manipulation of compressed images, such as rotation, to allow more efficient processing of the input print data stream 140.

Figure 2:
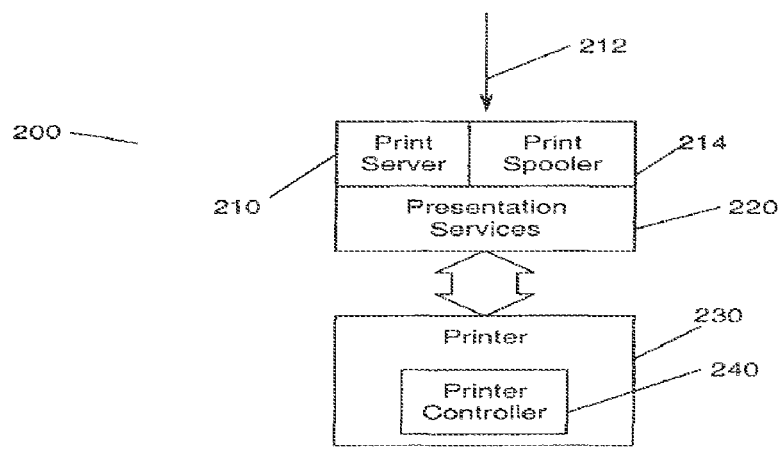
FIG. 2 illustrates a more detailed block diagram of one embodiment of a printer system according to the present invention.

FIG. 2 illustrates a more detailed block diagram of one embodiment of a printer system 200 according to the present invention. In FIG. 2, the printer system 200 includes a print server 210 for receiving the input print data stream 212, a print spooler 214 for controlling the spooling of data files and presentation services 220 for generating appropriate commands to drive an attached printer 230. The print server 210 may also include other components that are not shown for performing basic tasks, such as monitoring and configuring attached printers, and providing print job management. The printer server 210 converts the input print data steam 212 to a data steam supported by the printer 230. The print server 210 may be configured to provide image processing such as halftoning according to the present invention. Alternatively, the image processing may be performed local to the printer 230, e.g., by the printer controller 240.

Figure 3:
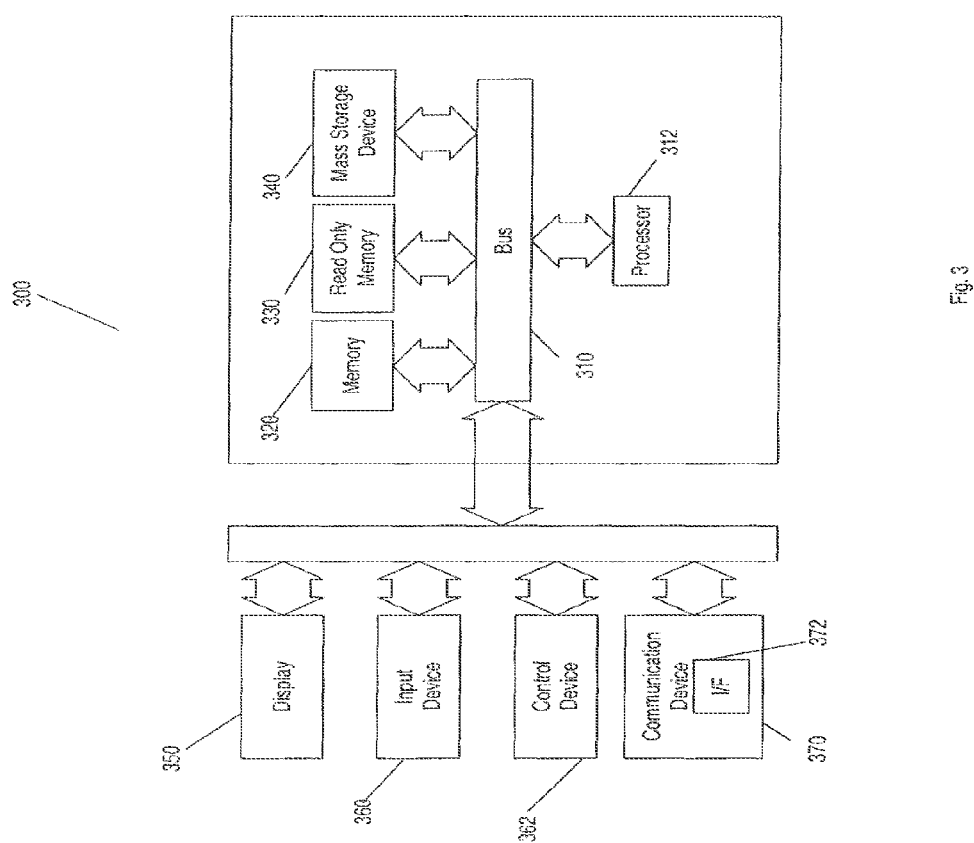
FIG. 3 illustrates one embodiment of device in the form of a computer system in which features of the present invention may be implemented.

Having briefly described one example of a printing environment in which the present invention many be employed, one embodiment of device in the form of a computer system 300 in which features of the present invention may be implemented will now be described with reference to FIG. 3. As shown in FIG. 3, the computer system 300 may represent a workstation, host, server, print server, printer or printer controller. Computer system 300 includes a bus or other communication means 310 for communicating information and a processing means such as a processor 312 coupled with bus 310 for processing information. Computer system 300 also includes a random access memory (RAM) or other dynamic storage device 320, coupled to bus 310 for storing information and instructions to be executed by processor 312. Memory 320 also may be used for storing temporary variables or other intermediate information during execution of instructions by processor 312. Computer system 300 may also include a read only memory (ROM) and/or other static storage device 330 coupled to the bus 310 for storing static information and instructions for 312.

A data storage device 340 such as a magnetic disk or optical disk and its corresponding drive may also be coupled to the computer system 300 for storing information and instructions. Computer system 300 can also be coupled via bus 310 to a display device 350, such as a cathode ray tube (CRT) or Liquid Crystal Display (LCD), for displaying information to an end user. Typically, an input device 360 is coupled to bus 310 for communicating information and/or command selections to processor 312. Another type of user input device 362 communicates direction information and command selections to processor 312 and for controlling cursor movement on display 350.

A communication device 370 is also coupled to bus 310. Depending upon the particular presentation environment implementation, the communication device 370 may include a modem, network interface card or other well know interface devices 372, such as those used for coupling to Ethernet, token ring, or other types of physical attachment for purposed of providing communication link to support a local or wide area network, for example. In this manner, the computer system 300 may be coupled to a number of clients and/or servers via a conventional network infrastructure.

The present invention is related to the use of computer system 300 to direct the execution of one or more software and/or firmware routines to manipulate print images as discussed herein. As computer system 300 executes the one or more routines, the processor 312 may access image data stored within memory 320, ROM 330, or another storage device to manipulate an image according to the halftone process described herein. Importantly, the present invention is not limited to having all of the routines located on the same computer system. Rather, individual objects, program elements, or portions thereof may be spread over a distributed network of computer systems. Additionally, those skilled in the art will recognize that a lesser or more equipped computer system than the example described above may be desirable for certain implementations. Therefore, the configuration of computer system 300 will vary from implementation to implementation depending upon numerous factors, such as price constraints, performance requirements, and/or other circumstances. For example, according to one embodiment of the present invention, an embedded printer controller may comprise only a processor and a memory for storing static or dynamically loaded instructions and/or data.

Figure 4:
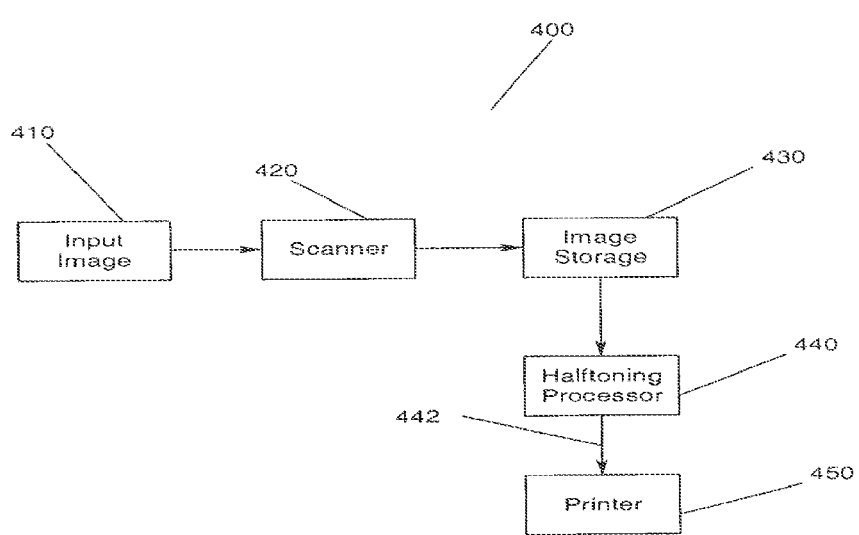
FIG. 4 illustrates a block diagram of a halftoning system according to the present invention.

FIG. 4 illustrates a block diagram of a halftoning system 400 according to the present invention. In FIG. 4, an input image 410 is scanned by a scanner 420 and stored in image storage 430. A halftoning process 440 processes the stored image to using a halftoning threshold matrix to determine whether a pel at a location (u, v), where u and v are integers, will get printed as a dot. The output 442 of the halftoning processor 440 is sent to a printer 450. The halftoning process according to the present invention will now be explained herein below with reference to FIGS. 5a-b, 6 and 7.

Figures 5A, 5B, 6, 7:
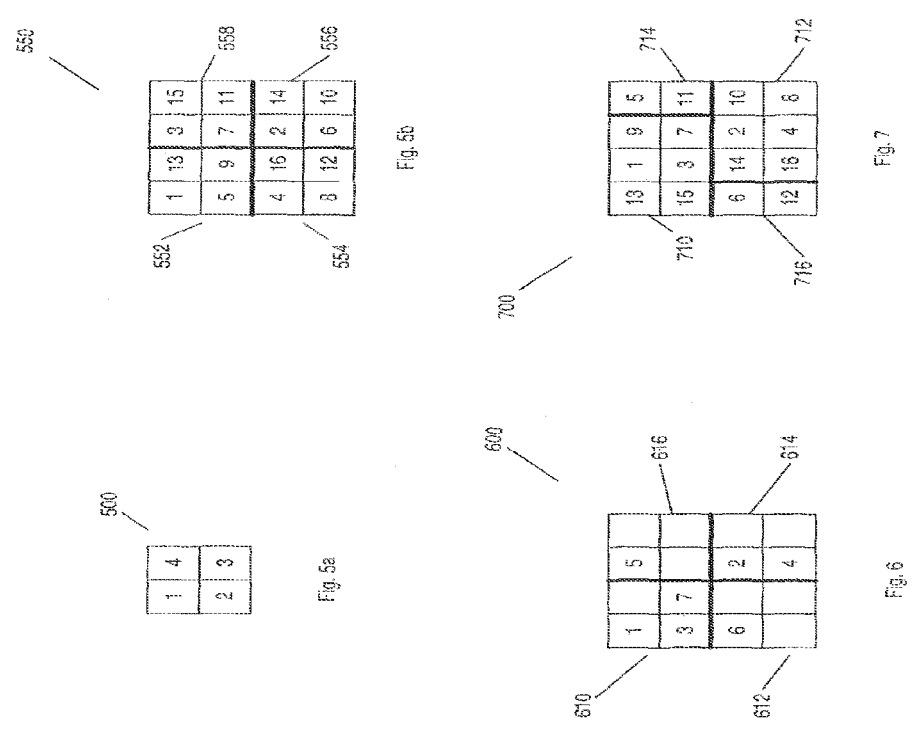

FIG. 5a illustrates the structure of a basic cell 500. In FIG. 5a, the cell comprises a 2×2 pel matrix. The basic cell structure 500 allowed at most one additional pel to be turned on with an increment to the next input value.

The goal in halftoning continuous-tone pictures or multi-level computer-generated graphics is to give an illusion of the many shades contained in the original multi-bit (usually 8-bit) values per component sample while using only one bit per sample. One traditional technique for halftoning is to create a threshold matrix (usually a different one for each component) and use it to select a threshold value per sample. The matrix is generally of much smaller dimensions than the image. For each line in the image a given threshold matrix row is cycled through repetitively. The next row is used for the next line. After the last row in the matrix the top row is used again.

These threshold matrices are generally referred to as "supercells." FIG. 5b illustrates a supercell 550. Supercells are made up of a much smaller basic cell that sets the halftone's lines per inch. Turning on the pels at a given position within the basic cells at sightly different levels allows the smaller basic cells to set the lines per inch and the large supercell to determine the number of shades obtainable. The smaller basic cells allow finer details to be preserved.

In FIG. 5, the supercell 550 comprises four basic cells 552, 554, 556 and 558. In the supercell 550, the density of the picture elements (pels) in a region is indicative of the original values in that region. If the basic cell structure 500 is simply enlarged to include additional pels, more shades may be represented, but the amount of detail that can be preserved is reduced since the larger basic cell structure has a coarse screen frequency (i.e., generated patterns with a low number of lines per inch in the halftone screen). The supercell 550 is an attempt to solve this problem. The supercell 550 basically groups multiple basic cells together. The supercell 550 attempts to improve both gradation and resolution. This method is generally referred to as the "Improved Halftone" (IH) method.

For example, in the IH method, an 4×4 superthreshold value matrix 550 may be divided into four 2×2 submatrices 552-558. Each of the small matrices 552-558 are adopted for the resolution unit, and the supercell matrix 550 is adopted for the gradation unit. Thus, the amount of detail is determined by the basic cell size 552-558 while the number of shades depends upon the size of the supercell 550.

As the supercells 550 have become larger, more than one pel inside the supercell 550 is turned on for the next input level. However, as illustrated by the reference numbers 1-16, never more than one pel is turned on at a time inside a basic cell 552-558 for the next constant input level. The patterns generated by repetition of the original basic cell 552-558 are contained in the patterns generated by the supercell 550.

FIG. 6 illustrates a supercell 600 wherein the restriction that at most one pel is turned on per basic cell for the next constant input level is removed and the pets in some basic cells are turned on much sooner that the corresponding positions in other basic cells. For example, as illustrated in FIG. 6, a first basic cell 610 has three pels turned on, i.e., 1, 3, 7, a second basic cell 612 has one pel turned on, i.e., 6, a third basic cell 614 has two pels turned on, i.e., 2, 4, and a fourth basic cell has one pel turned on, i.e., 5. This creates a dominant low frequency line screen simultaneously with the higher frequency line screen of the other basic cells.

FIG. 7 illustrates a supercell structure 700 wherein cells of different sizes and shapes are used. Thus, the cells participating in the low frequency screen 710, 712 could be larger than the cells gene rating the higher frequency screen 714, 716. For example, the pattern of the low frequency screens 710, 712 is pleasing to the eye and therefore generates patterns that distract the eye from noticing less pleasing patterns of the high frequency grids 714, 716, and vice versa.

The low frequency screens 710, 712 mask or reduce the impact of paper texture noise and printer glitches such as banding. On the other hand, high frequency screens 714, 716 allow additional detail and sharpness. The flexibility of mixing different line screens perceptually eliminates some of the annoying patterns generated by the horizontal and vertical repetition of the threshold matrix.

Thus, the supercell according to the present invention includes a plurality of submatrices, wherein a first group of the plurality of submatrices has a line screen frequency different from a second group of the plurality of submatrices. The embodiments described herein included two groups of basic cells for reasons of clarity and simplicity. However, extensions to more than two groups are contemplated and those skilled in the art will recognize that the present invention is not meant to be limited to two groups, but rather more than two groups of submatrices.

Each matrix in the first group of the plurality of submatrices includes a j×k matrix and each matrix in the second group of the plurality of submatrices includes a n×m matrix, where j, k, m and n are integers. This allows the creation of more than one screen frequency for a given input value. Including cells of significantly different size and shape creates the low and high screen frequencies and avoids less pleasing patterns. Moreover, the halftoning method according to the present invention provides more flexibility in selecting the supercell threshold values since the number of pels turned on in the basic cells are not restricted to be within one of each other for constant input value. These halftone patterns capture finer detail while hiding some artifacts from the printing process with a dominant coarser screen. The supercell may thus be filled with more than one basics cell shape and some basic cells may be filled in faster than other basic calls in the supercell.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A printer system, comprising:
a memory for storing an image for rendering; and
a halftoning processor, coupled to the memory, for processing the image in the memory according to a halftone threshold matrix, the halftoning processor for converting input gray-scale images into a dot pattern representing binary images to render the image, wherein the halftone threshold matrix comprises a supercell comprising a plurality of submatrices, the plurality of submatrices comprising a first group of submatrices and a second group of submatrices, wherein each matrix in the first group of submatrices is formed using a jXk submatrix and each matrix in the second group of submatrices is formed using a nXm submatrix, wherein j, k, m and n are integers and wherein j, k, m and n are not all equal and form the supercell with more than one shape and size of submatrices, and wherein at least one submatrix is filled in faster than the other submatrices in the supercell by turning on a predetermined number of pels less than all of the pels in the at least one submatrix to increase input levels without alternating to the other submatrices to turn on pels until the predetermined number of pels have been turned on.

2. The printer system of claim 1, wherein more than one pel in the at least one submatrix is turned on without turning on subsequent pels for increasing levels by alternating submatrices until each of the submatrices have had a pel turned on in turn.

3. The printer system of claim 1, wherein the at least one submatrix being filled in faster than the other submatrices in the supercell provides a dominant low frequency line screen simultaneously while the other submatrices provide a higher frequency line screen.

4. The printer system of claim 1, wherein the second group of submatrices masks print imperfections.

5. The printer system of claim 4, wherein the print imperfections comprise paper texture imperfections.

6. The printer system of claim 4, wherein the print imperfections comprise banding.

7. The printer system of claim 1, wherein the first group of submatrices provide greater detail and sharpness than the second group of submatrices.

8. The printer system of claim 1, wherein the first group of submatrices sets the lines per inch for the screen.

9. The printer system of claim 1, wherein the line screen frequency of the first group of submatrices is higher than the second group of submatrices.

10. The printer system of claim 9, wherein the second group of submatrices are larger than the first group of submatrices.

11. The printer system of claim 10, wherein the second group of submatrices determine a number of shades provided by the supercell.

12. The printer system of claim 9, wherein the supercell formed using the first and second groups of submatrices providing different line screens eliminates perceptually undesirable patterns generated by horizontal and vertical repetition of pels being turned on.

* * * * *